United States Patent
Koliyoor et al.

(10) Patent No.: US 10,346,864 B2
(45) Date of Patent: Jul. 9, 2019

(54) SYSTEM AND METHOD FOR TRANSACTION BASED PRICING

(71) Applicant: TATA CONSULTANCY SERVICES LIMITED, Mumbai, Maharashtra (IN)

(72) Inventors: Naveen Koliyoor, Bangalore (IN); Nitin Anant Mahamune, Mumbai (IN); Rajesh Agarwal, Mumbai (IN)

(73) Assignee: TATA CONSULTANCY SERVICES LIMITED (IN)

( * ) Notice: Subject to any disclaimer, the term of this patent is extended or adjusted under 35 U.S.C. 154(b) by 776 days.

(21) Appl. No.: 14/090,718

(22) Filed: Nov. 26, 2013

(65) Prior Publication Data
US 2014/0188562 A1    Jul. 3, 2014

(30) Foreign Application Priority Data
Dec. 27, 2012  (IN) .......................... 3713/MUM/2012

(51) Int. Cl.
| | |
|---|---|
| *G06Q 30/00* | (2012.01) |
| *G06Q 30/02* | (2012.01) |
| *G06N 5/02* | (2006.01) |
| *G07F 17/32* | (2006.01) |
| *G07F 7/10* | (2006.01) |
| *G06Q 40/04* | (2012.01) |
| *G06F 16/2457* | (2019.01) |
| *G06F 16/9535* | (2019.01) |
| *G06F 16/2455* | (2019.01) |
| *H04M 3/51* | (2006.01) |

(52) U.S. Cl.
CPC ..... *G06Q 30/0206* (2013.01); *G06F 16/2455* (2019.01); *G06F 16/24578* (2019.01); *G06F 16/9535* (2019.01); *G06N 5/025* (2013.01); *G06Q 30/0203* (2013.01); *G06Q 40/04* (2013.01); *G07F 7/10* (2013.01); *G07F 17/329* (2013.01); *G07F 17/3288* (2013.01); *H04M 3/51* (2013.01)

(58) Field of Classification Search
None
See application file for complete search history.

(56) References Cited

U.S. PATENT DOCUMENTS 7,548,871 B2    6/2009  Ricketts
7,711,604 B1 *  5/2010  Walker ............... G06Q 30/0621
                                              705/26.5
(Continued)

*Primary Examiner* — Gurkanwaljit Singh
(74) *Attorney, Agent, or Firm* — Barnes & Thornburg LLP

(57) ABSTRACT

System and method for transaction based pricing are described. The method comprises defining one or more transactions which include at least one sub-process. Further, units per transaction for each of the at least one sub-process is identified based on requirement data. Thereafter, a process complexity is assigned to the each of the at least one sub-process based on a complexity score computed for the each of the at least one sub-process. Further, a processing time is obtained for the each of the at least one sub-process based on the process complexity assigned to the each of the at least one sub-process. Further, estimated efforts for performing the one or more transactions are ascertained based on the processing time obtained for the each of the at least one sub-process. Furthermore, pricing for each of the one or more transactions is identified based on the estimated efforts.

17 Claims, 5 Drawing Sheets

(56) References Cited

U.S. PATENT DOCUMENTS

| | | | | |
|---|---|---|---|---|
| 9,070,152 B1* | 6/2015 | Zeviar | ................ | G06Q 30/0282 |
| 2004/0267676 A1* | 12/2004 | Feng | ................ | G06Q 30/0283 |
| | | | | 705/400 |
| 2007/0043606 A1* | 2/2007 | Kothari | ................ | G06Q 30/02 |
| | | | | 705/7.32 |
| 2007/0244766 A1* | 10/2007 | Goel | ................ | G06Q 10/02 |
| | | | | 705/5 |
| 2009/0192844 A1 | 7/2009 | Ramkumar et al. | | |
| 2011/0040592 A1* | 2/2011 | Kurtzig | ................ | G06Q 10/10 |
| | | | | 705/7.35 |
| 2012/0197820 A1* | 8/2012 | Kurtzig | ................ | G06Q 10/10 |
| | | | | 705/400 |

\* cited by examiner

| Sr.No. | Horizontal/Vertical | Business Process | Process | Sub Process | Qualifying the processes to complexity (High, Medium, Low) | | Parameter complexity score | Question Rank Score | Process Complexity | Process Complexity | UPT (Mins) |
|---|---|---|---|---|---|---|---|---|---|---|---|
| | | | | | Question (Major attributes those drive effort variation) | Answer | | | | | |
| 1 | Finance and Accounting Outsourcing | P2P | Accounts Payable | Audit | | | | | 125 | H | 22.5 |
| | | | | | Industry | Manufacturing | 1 | 0 | 0 | | |
| | | | | | Data readiness for Audit | <50 % | 3 | 9 | 27 | | |
| | | | | | Number of Fields Indexing/ key in | >10 | 3 | 4 | 12 | | |
| | | | | | Platform / Technology | Legacy (Others) | 3 | 5 | 15 | | |
| | | | | | Number of Application/ screen toggling | 3 to 5 | 2 | 2 | 4 | | |
| | | | | | First Pass Yield | <40 % | 3 | 7 | 21 | | |
| | | | | | Audit analysis | Manual | 2 | 8 | 16 | | |
| | | | | | Dependency for Query resolution | Third party | 3 | 3 | 9 | | |
| | | | | | Region | Europe | 3 | 1 | 3 | | |
| | | | | | Audit plan | No | 3 | 6 | 18 | | |
| 2 | Finance and Accounting Outsourcing | P2P | Accounts Payable | Debit Balance and fund recovery | | | | | 54 | L | 13 |
| | | | | | Industry | Manufacturing | 1 | 0 | 0 | | |
| | | | | | Data readiness for analysis | >80 % | 1 | 8 | 8 | | |
| | | | | | Follow-up for recovery | No | 1 | 3 | 3 | | |
| | | | | | Platform / Technology | SAP | 1 | 5 | 5 | | |
| | | | | | Number of Application/ screen toggling | <3 | 1 | 2 | 2 | | |
| | | | | | First Pass Yield | >70 % | 1 | 6 | 6 | | |
| | | | | | Debit Balance analysis | Manual | 2 | 7 | 14 | | |
| | | | | | Dependency for Query resolution | Third party | 3 | 4 | 12 | | |
| | | | | | Region | NA | 1 | 1 | 1 | | |
| | | | | | Follow-up for recovery | Yes | 1 | 3 | 3 | | |
| 3 | Finance and Accounting Outsourcing | P2P | Accounts Payable | Invoice Processing | | | | | 73 | M | 6.3 |
| | | | | | Industry | Manufacturing | 1 | 1 | 1 | | |
| | | | | | Input Source (Electronic to Manual) | 40 % to 70 % | 2 | 9 | 18 | | |
| | | | | | Number of Fields Indexing/ key in | <5 | 1 | 8 | 8 | | |
| | | | | | Platform / Technology | SAP | 1 | 6 | 6 | | |
| | | | | | Number of Application/ screen toggling | <3 | 1 | 2 | 2 | | |
| | | | | | First time Invoicing | >70 % | 1 | 7 | 7 | | |
| | | | | | Invoice Type (PO to non PO Ratio) | 70 to 90 % | 2 | 5 | 10 | | |
| | | | | | Dependency for Query resolution | Third party | 3 | 4 | 12 | | |
| | | | | | Region | Latam | 3 | 3 | 9 | | |

Figure 2(b)

| ToC | | | | | | | | | | | |
|---|---|---|---|---|---|---|---|---|---|---|---|
| Client | Process | Sub-process | Inscape Y/N? (Valid if Custom) | Unit of Measure | Volume data (Nos) | Units per Txn (in ToC) | UPT (Custom) (Min) | UPT Std | UPT (Min) | Total Efforts (Min) | Complexity (Custom) | Complexity |
| India | 21363 | | | | | | | | | 9.35 | | |
| | | Invoice Processing | Yes | Invoice | 21363 | 1.00 | 6.3 | 6.3 | 6.30 | 6.30 | M | M |
| | | Debit Balance and fund recovery | No | Number of invoices handled for | 0 | | | 37.5 | | | M | |
| | | Process Payments | Yes | Number of Disbursements | 12297 | 0.40 | 0.3 | 0.4 | 0.40 | 0.16 | M | M |
| | Transaction1: Account Payable (Normal Invoice) | Query Resolution | Yes | Invoice or Queries handled | 1968 | 0.15 | 6.5 | 10 | 10.00 | 1.50 | M | M |
| | | Reporting | Yes | Number of reports | 60 | 0.01 | 18.6 | 46.25 | 46.25 | 0.46 | M | M |
| | | Vendor Maintenance | Yes | Number of request handled | 644 | 0.05 | 12.4 | 18.6 | 18.60 | 0.93 | H | H |
| | | Vendor Reconciliation | No | Number of reconciliation done | 300 | | 40 | 60 | | | H | |
| | | | Yes | | | 0.00 | | | 0.00 | 0.00 | L | L |
| | | | Yes | | | 0.00 | | | 0.00 | | L | L |
| | 1900 | | | | | | | | | 7.57 | | |
| | | T&E Processing | Yes | Invoice | 1900 | 1.00 | 6.8 | 6.8 | 6.80 | 6.80 | L | L |
| | | Audit | No | Number of audits conducted | | | 5.7 | 22.5 | | | L | |
| | Transaction2: Account Payable (T&E Invoice) | Process Payments | Yes | Number of Disbursements | 1134 | 0.50 | 0.3 | 0.3 | 0.30 | 0.15 | L | L |
| | | Query Resolution | No | Invoice or Queries handled | | | 6.5 | 15 | | | L | |
| | | Vendor Maintenance | Yes | Number of request handled | 55 | 0.05 | 12.5 | 12.4 | 12.40 | 0.62 | M | M |
| | | | No | | | 0.00 | | | 0.00 | 0.00 | | H |

Figure 2(c)

SYSTEM AND METHOD FOR TRANSACTION BASED PRICING

PRIORITY CLAIM

This patent application claims priority to Indian Patent Application No. 3713/MUM/2012, filed 27 Dec. 2012, the disclosure of which is incorporated herein by reference in its entirety.

TECHNICAL FIELD

The present subject matter relates, in general, to determination of transaction based pricing, and in particular, to a system and a computer-implemented method for detecting transaction based pricing.

BACKGROUND

Outsourcing may be defined as a process of entering into a contract with an organization or a person to do a particular function, which typically can otherwise be done in-house. In outsourcing, an organization or a person who offers their services is referred to as a vendor and an organization or a person who takes services of the vendor is referred to as a client. When the client outsources some work to the vendor, they sign an agreement, which includes parameters, such as price for performing the outsourced process, quality of work, and duration of work. Such type of agreement is generally referred to as an outsourcing engagement. In one scenario, to meet the expectation of both, the client and the vendor, the price of performing the outsourced process should be such that both the parties benefit from the outsourcing engagement.

In outsourcing industry, various types of pricing models are used to determine the price of the outsourced process, such as an input based pricing model and a transaction based pricing model. In the input based pricing model, the client pays for time and material of the vendor resources. For example, if ten people work together to perform the outsourced process, then the client would pay for the ten people only and not for the amount of work done. Whereas, in the transaction based pricing model, the client pays to the vendor for transactions or per unit of work performed. For example, if in the outsourcing engagement, it has been decided that resolving a query would cost hundred rupees to the client, then the client will pay depending upon the number of query resolved, irrespective of the resources employed by the vendor. That is why many clients prefer the transaction based pricing over the input based pricing in situations where they are able to create transactions and processes. But at the same time, the transaction based pricing pose a complex question of deciding or estimating the apt price for the amount of work outsourced, for the vendor and the client. Therefore, estimating effort required for performing the outsourced process and pricing the outsourced process have become one of the important activities in the outsourcing industry.

SUMMARY

This summary is provided to introduce concepts related to effort estimation and determining transaction based pricing in an outsourcing industry. These concepts are further described below in the detailed description. This summary is not intended to identify essential features of the claimed subject matter nor is it intended for use in determining or limiting the scope of the claimed subject matter.

In one embodiment, a system and a method for transaction based pricing are described. The method comprises defining one or more transactions which include at least one sub-process. Further, units per transaction for each of the at least one sub-process is identified based on requirement data. Thereafter, a process complexity is assigned to the each of the at least one sub-process based on a complexity score computed for the each of the at least one sub-process. Further, a processing time is obtained for the each of the at least one sub-process based on the process complexity assigned to the each of the at least one sub-process. Further, estimated efforts for performing the one or more transactions are ascertained based on the processing time obtained for the each of the at least one sub-process. Furthermore, pricing for each of the one or more transactions is identified based on the estimated efforts.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which:

FIG. 2(b) illustrates a screenshot depicting process of identifying a process complexity, according to an embodiment of the present subject matter.

FIG. 2(c) illustrates a screenshot depicting a table of construct, according to an embodiment of the present subject matter.

DETAILED DESCRIPTION

Figure 1:
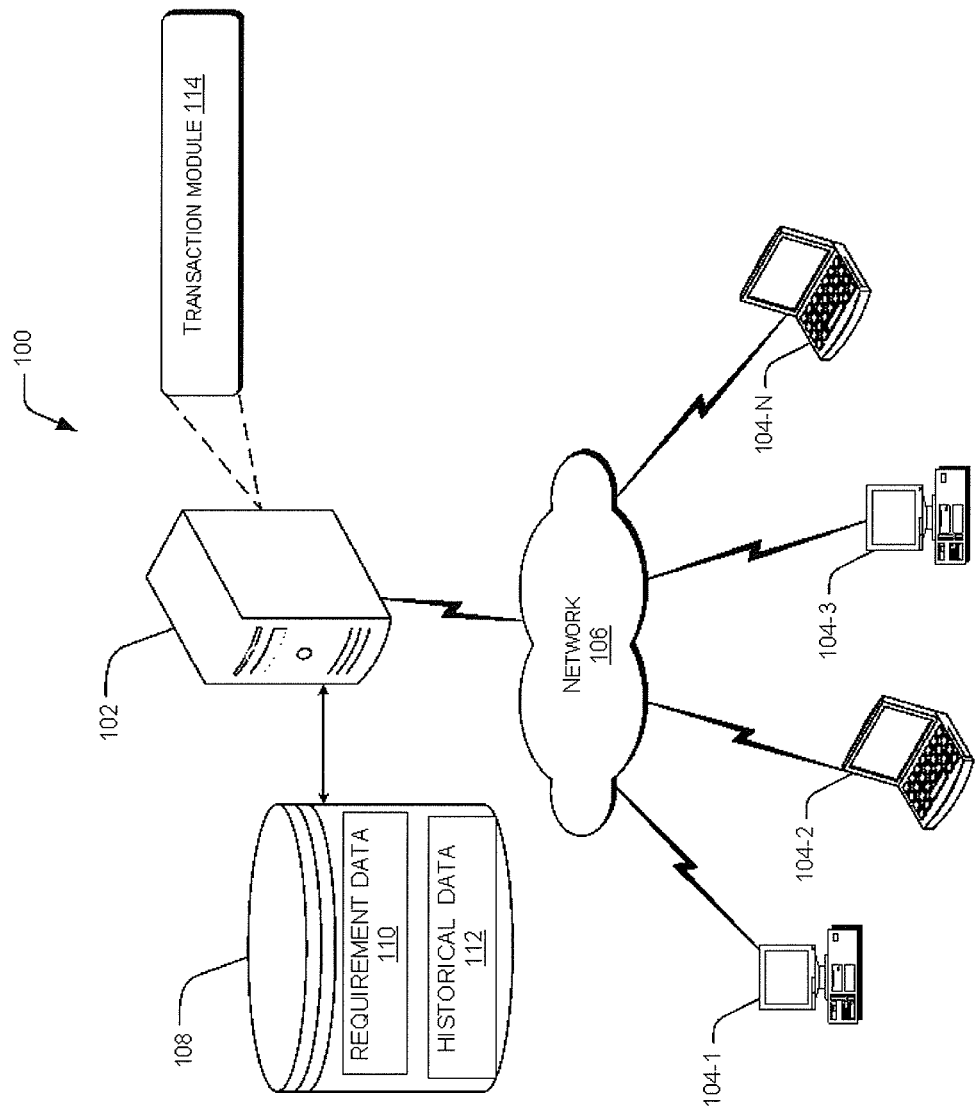
FIG. 1 illustrates a network environment implementing a transaction based pricing system, according to an embodiment of the present subject matter.

In an outsourcing industry, one of the main challenges is to determine a pricing for the outsourced process. Depending upon operating conditions and efforts required for performing the outsourced process, the pricing may differ for different processes. The outsourced process may be defined as a process which is outsourced by a client to a vendor or a service provider. The outsourced process may comprise multiple transactions, which comprise of multiple sub-processes carried out at different point in time, either in parallel or sequentially. For example, a software company may outsource the process of maintaining the software to the service provider and the maintaining of the software may comprise transactions, such as resolving a query, generation of invoices, and reporting to the client. In the said example, generation of invoices is one transaction which may includes sub-processes, such as process payments, reporting, and invoice processing.

Due to involvement of so many transactions and sub-process, there are various challenges faced by the outsourcing organizations in estimating efforts and transaction based pricing for the outsourced process. Firstly, the outsourcing organizations have to decide on time required to execute particular piece of work and time required to perform the work may vary depending on operating conditions, such as type of platform or technology used for performing the transaction, industry, data readiness, and input source is electronic or manual. Secondly, the outsourcing organizations have to envisage capacity requirements to optimize team strength based on incoming volume flow, variation, spikes, and seasonality, and also the attrition and learning curve based on the industry specific skills. Thirdly, the outsourced process is performed at sub-process level defined at user specific level which cannot be utilized across the industries or domains. Therefore, many outsourcing organization are using various unstructured methods for estimating efforts and then estimating pricing for the outsourced process and there is no structured and uniform way of defining and configuring the transactions, and estimating efforts for the transaction based pricing.

In accordance with the present subject matter, a system and a computer-implemented method for determining transaction based pricing are described. The system as described herein is a transaction based pricing system, hereinafter referred to as a system. Initially, a capability database for storing historical data of an outsourcing organization and requirement data provided by clients is maintained, according to one implementation. The capability database can be an external repository associated with the system, or an internal repository within the system. The historical data may include data associated with outsourced processes performed by the outsourcing organizations, such as processing time of resolving a query, processing time for processing payments, and trends in volume of work outsourced. The requirement data may include data provided by clients depending upon their requirements. For example, a client may want reporting of invoices every week or may want to outsource only some specific sub-processes in a transaction. In one implementation, the required data may be directly obtained from the clients. For example, the system may provide a questionnaire on a display panel to a client, from where the client can enter the requirements in the system directly. Whenever the system determines the transaction based pricing for the outsourced process, the data stored in the capability database may be retrieved. Further, the data contained within the capability database may be updated, whenever required. For example, new data may be added into the database whenever a new transaction is defined, existing data can be modified based on processing of work and customer requirements, or non-useful data may be deleted from the capability database.

In one implementation, one or more transactions are defined and each of the one or more transactions may comprise at least one sub-process. The one or more transactions may be defined as a sequence of various sub-processes which helps in achieving a business purpose. For example, in finance and accounting business process outsourcing (BPO), an invoice may be defined as the transaction which comprises sub-processes, such as invoice processing, debit balance and fund recovery, process payments, query resolution, reporting, vendor maintenance, and vendor reconciliation. In one implementation, the client may choose the sub-processes in the transaction depending upon his requirements. For example, the client may not want to debit balance and fund recovery in the transaction of invoice. In such cases, the client may easily deselect the sub-process. Similarly, the client may add new sub-processes in the transaction.

Once the one or more transactions are defined, units per transaction are identified for each of the at least one sub-process included in each of the one or more transactions. The units per transaction for the each of the at least one sub-process is identified based on the requirement data provided by the client. For example, the client may specify the sub-processes to be included in the transaction and information about volume of sub-processes, such as reporting of invoice may be done weekly or monthly basis. In one implementation, the requirement data may be extracted from the capability database for identifying the units per transaction for the each of the at least one sub-process.

Thereafter, a process complexity is assigned to the each of the at least one sub-process based on a complexity score assigned to the each of the at least one sub-process. The complexity score may be computed based on a complexity questionnaire. In an implementation, the sub-process may include various parameters which are responsible for driving effort variation. For example, follow-up recovery, platform or technology, input source (electronic or manual), industry, region, first time invoicing, and data readiness for various operations. Further, the system may generate the complexity questionnaire for team members of the service provider to rate the parameters depending upon the complexity. Once, the parameters are rated based on the complexity questionnaire filled by the team members, the process complexity score may be obtained for the each of the at least one sub-process.

Further, a possible total score may be defined as a maximum complexity score which may be assigned to a sub-process based on the complexity questionnaire. In one implementation, a high process complexity may be assigned to a sub-process having the complexity score ranging from 0 to 30% of a total possible score, a medium process complexity to may be assigned to a sub-process having the complexity score ranging from 31% to 75%, and a low process complexity may be assigned to a sub-process having the complexity score ranging from 76% to 100%.

Further, based on the complexity assigned to the each of the at least one sub-process, a processing time is obtained for each of the at least one sub-process from the historical data stored in the capability database. Furthermore, estimated efforts to perform the one or more transactions are ascertained based on the processing time obtained from the historical data. Once the estimated efforts are ascertained, the service provider may determine the pricing for each of the one or more transactions. In one implementation, the service provider may perform the sensitivity analysis to analyze variations in revenue generated with respect to the one or more transactions performed. The sensitivity analysis allows the service provider to see whether his resources are getting utilized as determined by the system. Further, the sensitivity analysis may allow the service provider to make comparison between the input based pricing and the transaction based pricing for the volume of work received.

According to the system and the computer-implemented method of the present subject matter, define the one or more transactions and then determine the pricing for the one or more transactions. The sub-processes included in the transactions are flexible and the client may select or deselect the sub-processes depending upon his requirements. The system envisages transactions and determines the efforts needed to perform the transaction. Thus, a pricing is determined for the transaction is determined which meets the expectation of the client and the service provider.

The following disclosure describes a system and a method for determining transaction based pricing. While aspects of the described system and method can be implemented in any number of different computing systems, environments, and/or configurations, embodiments for determining the transaction based pricing are described in the context of the following exemplary system(s) and method(s).

FIG. 1 illustrates a network environment 100 implementing a transaction based pricing system 102 (hereinafter referred to as system 102), in accordance with an embodiment of the present subject matter. In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The system 102 is communicatively connected to a plurality of user devices 104-1, 104-2, 104-3 . . . 104-N, collectively referred to as user devices 104 and individually referred to as a user device 104, through a network 106. In one implementation, a plurality of users, such as service providers and clients may use the user devices 104 to communicate with the system 102.

The system 102 and the user devices 104 may be implemented in a variety of computing devices, including, servers, a desktop personal computer, a notebook or portable computer, a workstation, a mainframe computer, a laptop and/or communication device, such as mobile phones and smart phones. Further, in one implementation, the system 102 may be a distributed or centralized network system in which different computing devices may host one or more of the hardware or software components of the system 102.

The system 102 may be connected to the user devices 104 over the network 106 through one or more communication links. The communication links between the system 102 and the user devices 104 are enabled through a desired form of communication, for example, via dial-up modem connections, cable links, digital subscriber lines (DSL), wireless, or satellite links, or any other suitable form of communication.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the system 102 and the user devices 104. The network devices within the network 106 may interact with the system 102, and the user devices 104 through the communication links.

The network environment 100 further comprises a capability database 108 communicatively coupled to the system 102. In one implementation, the capability database 108 may store requirement data 110 provided by the clients and the service providers. For example, the client may provide information related to amount of work to be outsourced. In another example, the client may specify sub-processes he/she wants to be included in a transaction. As indicated previously, the requirement data 110 include, but is not limited to, data associated with outsourced process. The capability database 108 also comprises historical data 112 which may include information about various process performed by the service provider. For example, a transaction and exportation (T&E) invoice is generated by the service provider, then the information about the T&E invoice, such as processing time, complexity, skill required, and cyclicity in arrival of the T&E invoice may be stored in the historical data 112.

Although the capability database 108 is shown external to the system 102, it will be appreciated by a person skilled in the art that the capability database 108 can also be implemented internal to the system 102, wherein the requirement data 110 and the historical data 112 may be stored within the system 102.

According to an implementation of the present subject matter, the system 102 may include a transaction module 114. The transaction module 114 may be configured to define one or more transactions in the outsourced process. The one or more transactions may be defined as a sequence of various sub-processes which helps in achieving a business purpose. In one implementation, the one or more transaction may comprise at least one sub-process. In one example, in finance and accounting outsourcing industry, a transaction of "normal invoice" may include sub-processes, such as "invoice processing", "debit balance and fund recovery", "process payments", "query resolution", "reporting", "vendor maintenance", and "vendor reconciliation". In another example, a transaction of "T&E invoice" may include sub-process, such as "T&E processing", "audit", "process payments", "query resolution", and "vendor maintenance".

The at least one sub-process in each of the one or more transaction may get performed in different combinations and at different points of time, which may not be very visible and apparent. For example, the fund recovery may be performed once in a month, but the reporting should be performed daily. Therefore, two different sub-processes may take place at different point of time. The transaction module 114 may define the one or more transactions which have flexible sub-process. This may allow clients to select and deselect the sub-processes depending upon the requirements. The at least one sub-process combines in different proportions and different combination to complete the one or more transactions.

Once the one or more transactions and there sub-processes are defined, the transaction module 114 may identify units per transaction for each of the at least one sub-process based on the requirement data 110. In one implementation, the transaction module 114 extracts the requirement data 110 from the capability database 108 for indentifying the units per transaction for the each of the at least one sub-process. In another implementation, the requirement data 110 may be present within the system 102 to identify the units per transactions for the each of the at least one sub-process. The units per transactions for a sub-process may be defined as amount of work to be performed to complete the sub-process in a transaction. In one implementation, the units per transactions are identified based on unit of measure available in the requirement data 110. For example, units per transaction for a "process payments" sub-process may be identified based on "number of disbursements". Here, the unit of measure is "number of disbursements". In another example, the units per transaction for "query resolution may" be identified based on "number of query handled or resolved". In said example, the unit of measure is "number of query handled or resolved".

Thereafter, the transaction module 114 may assign a process complexity to the each of the at least one sub-process based on a complexity score computed for the each of the at least one sub-process. The transaction module 114 may compute the complexity score for the each of the at least one sub-process based on a complexity questionnaire. The each of the at least one sub-process may include parameters which are responsible for driving any effort variation. In an example, for "process payments" sub-process, the parameters may include, "industry", "data readiness to payments", "number of fields indexing", "platform or technology", "number of application or screen toggling", "first pass yield", and "electronic to manual payment ratio". Therefore for determining the complexity score, the transaction module 114 may generate the complexity questionnaire for team members of the service provider. The team members may rate the parameters based on their prior experience and comfort level with the sub-processes. Subsequently, the complexity score is computed for the each of the at least one sub-process based on the team members input on the complexity questionnaire.

For example, the transaction module 114 may compute the complexity score based on the complexity questionnaire. The complexity questionnaire may ask the team members to rate the parameters. In one example, the transaction module 114 may assign a parameter complexity score of 1 to the "industry", which is one of the parameters of the sub-process invoice processing. Similarly, the transaction module 114 may assign a question rank score of 3 to the "industry". The parameter complexity score and question rank score assigned based on the complexity questionnaire. Further, the parameter complexity score and the question rank score may be combined to obtain the complexity score of 3 for the "industry". Similarly, the complexity score of 10 may be assigned to the "platform/technology" parameter. Finally, both the complexity score may be consolidated by the transaction module 114 to obtain the complexity score. Thereafter, the process complexity is assigned to the each of the at least one sub-process.

Further, a maximum complexity score which may be assigned to a sub-process may be referred to as a possible total score. In one implementation, the transaction module 114 may be configured to assign a high process complexity to a sub-process having the complexity score ranging from about 0 to 30% of a total possible score, a medium process complexity to a sub-process having the complexity score ranging from about 31% to 75%, and a low process complexity to a sub-process having the complexity score ranging from about 76% to 100%.

In an example, the possible total score which may be assigned to a sub-process is 150 and there are three sub process: a first sub-process, a second sub-process, and a third sub-process. Further, a complexity score of 25 is computed for the first sub-process, a complexity score of 60 is assigned to the second sub-process, and a complexity, and a complexity score of 120 is assigned to the third sub-process. In said example, the low process complexity may be assigned to the first sub-process, as the complexity score of 25 will in range from about 0 to 30% of the possible total score which is 150 in said example. Similarly, the medium process complexity is assigned to the second sub-process, as the complexity score of 60 will fall in a range from about 31% to 75% of the possible total score. Similarly, the high process complexity is assigned to the third process, as the complexity score of 120 will fall in a range from about 71% to 100% of the possible total score.

Further, the transaction module 114 may obtain a processing time from the historical data 112 for the each of the at least one sub-process based on the process complexity assigned. In one implementation, the sub-processes are classified into three buckets: a low complexity bucket, a medium complexity bucket, and a high complexity bucket. The sub-process assigned with a low process complexity belongs to the low complexity bucket. Similarly, the sub-process assigned with a medium process complexity belongs to the medium complexity bucket. Similarly, the sub-process assigned with a high process complexity belongs to the high complexity bucket. Therefore, the processing time may be obtained based on the historical data 112 of the sub-processes belonging to one of the three buckets. For example, if a sub-process belongs to the medium complexity bucket, then the processing time of the medium complexity bucket may be assigned to that sub-process.

In one implementation, the system 102 may ascertain estimated efforts for performing the one or more transactions on the processing time obtained from the historical data 112 based on the process complexity assigned to each of the at least one sub-process. Subsequently, the system 102 may determine the pricing for each of the one or more transactions. In one implementation, the system 102 may define volume bands for offering discounts based on the volume of the one or more transactions. For example, if the volume of the one more transactions is 110 to 130 percent of the specified volume, then the system 102 may offer 10 percent discount in the determined transaction based pricing.

In one implementation, the system 102 may allow the service providers to perform a sensitivity analysis to analyze variations in revenue generated with respect to the one or more transactions performed. The sensitivity analysis may enable the service provide to foresee revenue generated over a period of time on the user device 104, so that the service provider utilizes his resources in an efficient manner and tweak the determined transaction based pricing, if facing any loss while providing the services to the clients.

The manner in which transaction based pricing is determined is explained in greater detail according to FIG. 2(a)-2(c) and FIG. 3.

Figure 2A:
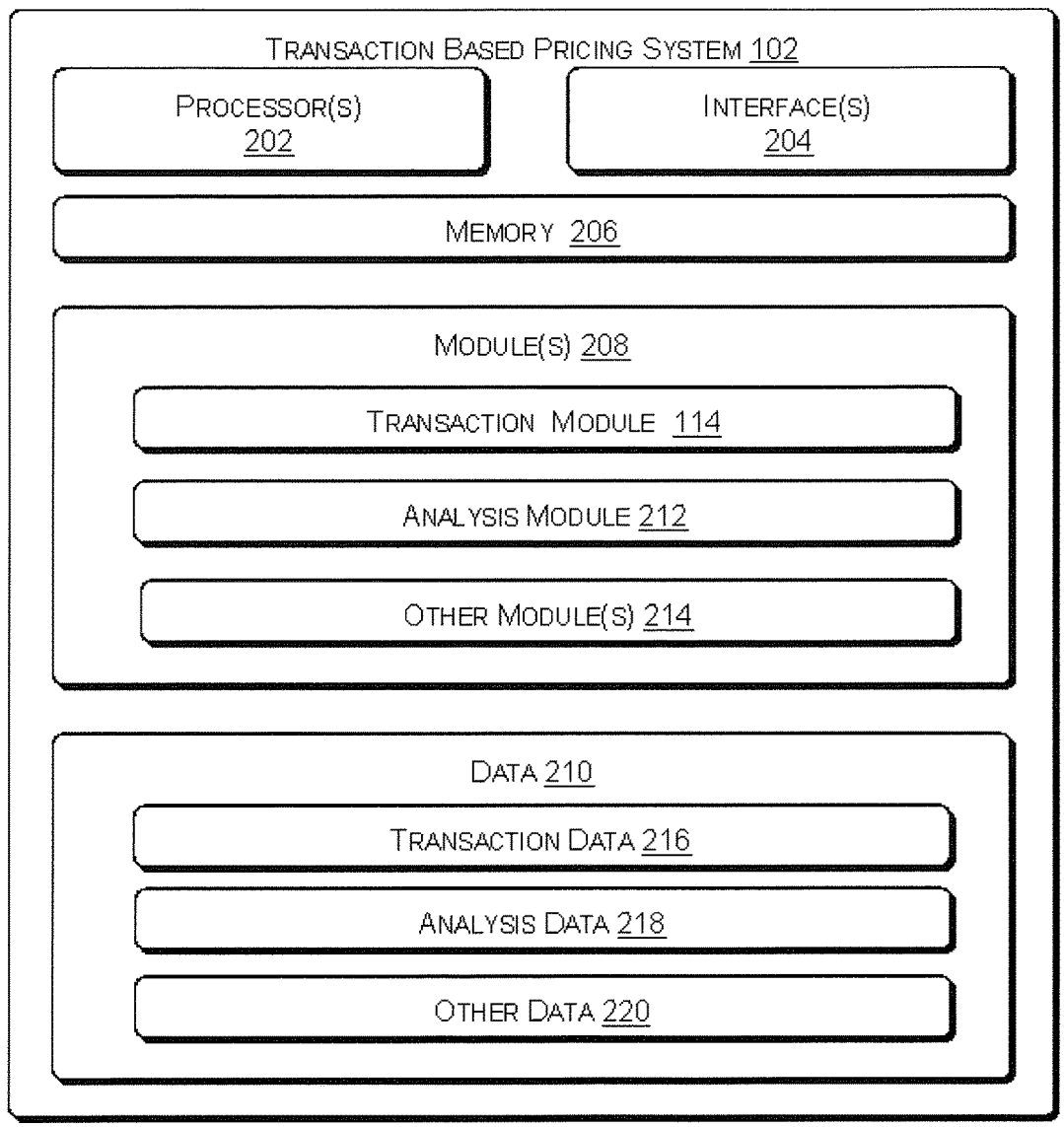
FIG. 2(a) illustrates components of the transaction based pricing system, according to an embodiment of the present subject matter.

FIG. 2(a) illustrates various components of a transaction based pricing system 102, according to an embodiment of the present subject matter. Hereinafter, the transaction based pricing system 102 may be also referred to as a system 102.

In said embodiment, the system 102 includes one or more processor(s) 202, interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 204 may include a variety of software and hardware interfaces, for example, interface for peripheral device(s), such as a keyboard, a mouse, an external memory, and a printer. Further, the interface(s) 204 may enable the system 102 to communicate over the network 106, and may include one or more ports for connecting the system 102 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The system 102 also includes module(s) 208 and data 210.

The module(s) 208 include routines, programs, objects, components, data structures, etc., which perform particular tasks or implement particular abstract data types. The module(s) 208 include the transaction module 114, an analysis module 212, and other module(s) 214. The other module(s) 214 may include programs or coded instructions that supplement applications and functions, for example, programs in the operating system of the user device 104 and the system 102.

The data 210 serves, amongst other things, as a repository for storing data processed, received and generated by one or more of the modules 208. The data 210 includes transaction data 216, analysis data 218, and other data 220.

In one implementation, the transaction module 114 may be configured to define one or more transactions in the outsourced process. The one or more transactions may be defined as a sequence of various sub-processes which helps in achieving a business purpose. In one implementation, the one or more transaction may comprise at least one sub-process. The at least one sub-process combines in different proportions and different combination to complete the one or more transactions. The transaction module 114 may define the one or more transactions in a manner which provides flexibility. For example, the transaction module 114 may allow clients to select and deselect the sub-processes depending upon their requirements. In one implementation, the transaction module 114 may store the one or more transactions are stored in the transaction data 216.

Further, transaction module 114 may identify units per transaction for each of the at least one sub-process based on requirement data 100 extracted from the capability database 108. The units per transactions for a sub-process may be defined as amount of work to be performed to complete the sub-process in a transaction. In one implementation, the transaction module 114 may identify the units per transactions on unit of measure available in the requirement data 110.

Further, the transaction module 114 may assign a process complexity to the each of the at least one sub-process based on a complexity score computed for the each of the at least one sub-process. The transaction module 114 may compute the complexity score based on a complexity questionnaire. The transaction module 114 may generate a set of questions depending upon the sub-process, also referred to as the complexity questionnaire. Team members of the service provide may provide answer to the questions or rate parameters listed in the complexity questionnaire with the help of the transaction module 114. The parameters may include various factors which are responsible for creating any variation in efforts. In one example, the complexity questionnaire may ask the team members to assign a parameter complexity score and a question rank score to the parameters of the sub-process. In an example, "invoice processing" sub-process may include parameters, such as "industry", "input source", "platform or technology", and "region". Further, the transaction module 114 may assign the parameter complexity score and question rank score based on the complexity questionnaire. For example, if "input source" parameter is manual instead of electronic, then the parameter complexity score of 2 may be assigned to the "input source". At the same time, the transaction module 114 may also compute the question rank score based on prior experience of team members of the service providers. The transaction module 114 may allow the team members to assign the question ranks score to the each of the parameters. Finally, the transaction module 114 may consolidate both, the parameter complexity score and the question rank score to obtain the complexity score. Thereafter, the process complexity may be assigned to the each of the at least one of sub-process based on the complexity score computed for the each of the at least one of sub-process.

In one implementation, if the complexity score is in a range substantially ranging from about 0 to 30% of possible total score is assigned to a sub-process, then that sub-process may be assigned with a low process complexity. Similarly, if the complexity score is in a range substantially ranging from about 31% to 75% of the possible total score is assigned to a sub-process, then that sub-process may be assigned with a medium process complexity. Similarly, if the complexity score is in a range substantially ranging from about 76% to 100% of the possible total score is assigned to a sub-process, then that sub-process may be assigned with a high process complexity. In one implementation, the transaction module 114 may store the process complexity assigned to the each of the at least one of sub-process in the transaction data 216.

FIG. 2(b) illustrates a screenshot depicting process of identifying a process complexity, according to an embodiment of the present subject matter. As shown in FIG. 2(b), "invoice processing" and "process payments" are two sub-process which further comprises various parameters, such as industry, input source, number of fields indexing in, platform/technology, first time invoicing, and region. The screenshot as shown in FIG. 2(b) also depicts the parameters complexity score, the question rank score, and the process complexity.

In one implementation, the transaction module 114 may obtain a processing time from the historical data 112 stored in the capability database 108 for the each of the at least one sub-process based on the process complexity assigned. For example, if a sub-process has the low process complexity, then the processing time of the sub-processes having low process complexity may be assigned to that-particular sub-process.

Further, the analysis module 212 may ascertain estimated efforts for performing the one or more transactions on the processing time obtained for the each of the at least one sub-process. For example, the transaction module 114 may determine that a transaction having sub-processes of high processing time may require more efforts to perform the transaction. Hence, transaction may require more unit of work to complete the transaction.

FIG. 2(*c*) illustrates a screenshot depicting a table of construct, according to an embodiment of the present subject matter. In one implementation, after the process complexity is assigned to the each of the at least one sub-process, the analysis module 212 may obtain a table of construct. The table of construct may comprise the one or more transactions, the at least one of sub-process, unit of measure, units per transaction, total efforts, and process complexity for the each of the at least one sub-process.

In one implementation, the analysis module 212 may determine the pricing for each of the one or more transactions based on the estimated efforts. In one example, for 1 unit of estimated efforts, the service provider may charge one thousand rupees. If the estimated efforts of ten units are required to perform the "invoice" transaction, then the analysis module 212 may determine that ten thousand rupees is the pricing for the "invoice" transaction. In one implementation, the analysis module 212 may store the pricing for the one or more in the analysis data 218 from where the service provider can easily access the pricing of the one or more transactions.

In one implementation, the analysis module 212 may define volume bands for offering discounts based on the volume of the one or more transactions. In an example, the analysis module 212 may follow discount scheme as given in Table 1 provided below.

TABLE 1

| Bands of volume (Transaction) | Discount to be Offered |
|---|---|
| 90-110 | Nil |
| 110-130 | 10% |
| 130-150 | 20% |
| Above 150 | 30% |

As given in Table 1, if the volume of the one more transactions is 110 to 130% of the specified volume, then the analysis module 212 may offer 10% discount in the determined transaction based pricing. Similarly, the analysis module 212 offer discounts to other bands of volume, such as 130 to 150% and above 150%.

In one implementation, the analysis module 212 may be configured to allow the service providers to perform a sensitivity analysis to analyze variations in revenue generated with respect to the one or more transactions performed. With the help of sensitivity analysis, the service provider may foresee revenue generated over a period of time. Further, the analysis module 212 may allow the service providers to adjust or re-determine the pricing of the one or more transactions, in case, resources of the service provider are not getting utilized properly or the revenue generated by the one or more transactions is not meeting the requirements of the service provider.

Figure 3:
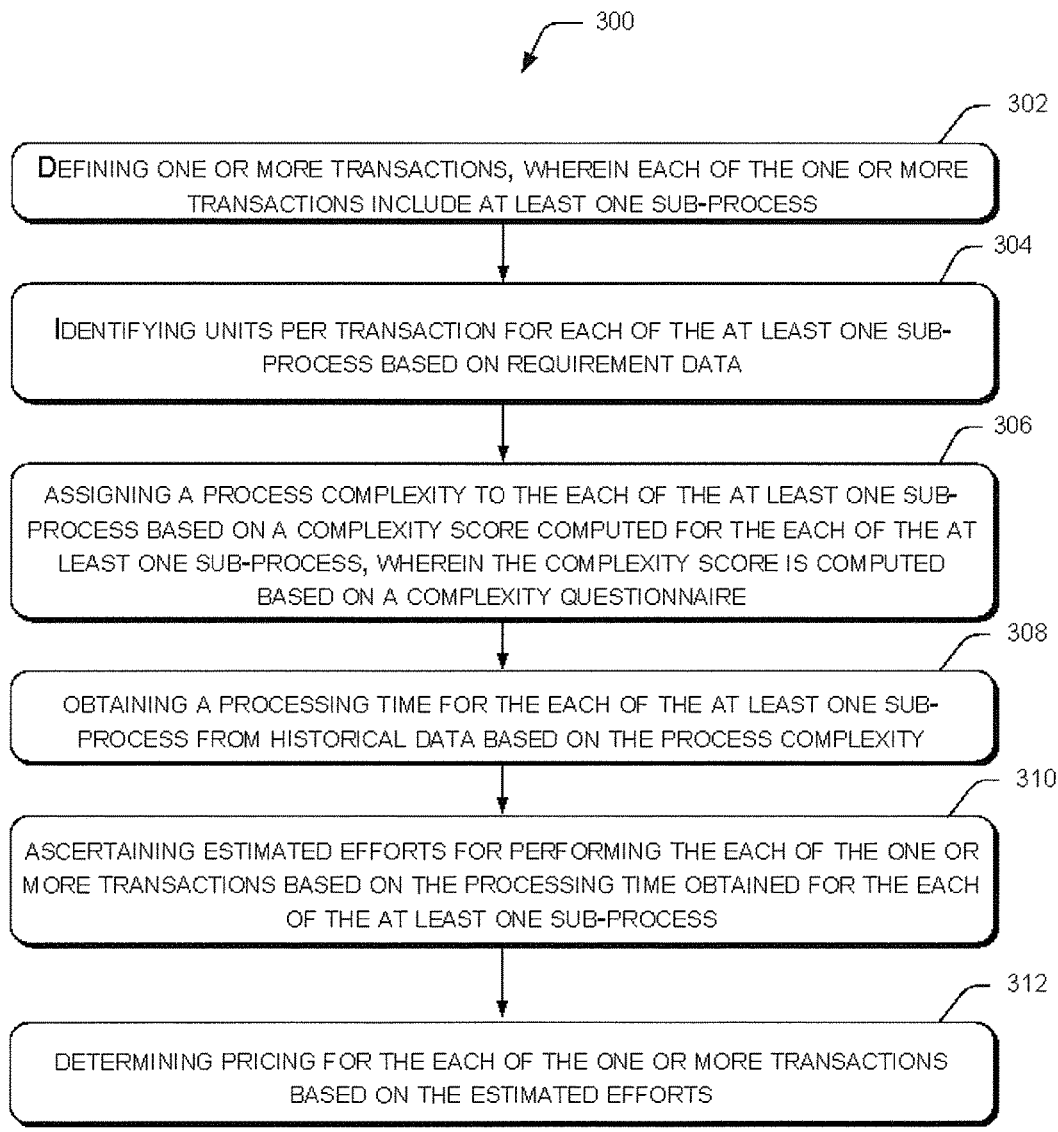
FIG. 3 illustrates a method for determining transaction based pricing, according to an embodiment of the present subject matter.

FIG. 3 illustrates a method 300 for determining transaction based pricing, in accordance to an embodiment of the present subject matter. The method 300 is implemented in computing device, such as a transaction based pricing system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, one or more transactions are defined. Each of the one or more transactions may include at least one sub-process. For example, a "normal invoice" transaction may be defined and the "normal invoice" may include sub-processes, such as invoice processing, debit balance and fund recovery, process payments, query resolution, reporting, vendor maintenance, and vendor reconciliation. In one implementation, the transaction module 114 defines the one or more transactions and the at least one sub-processes for the each of the one or more transactions. The transaction module 114 may allow clients to select and deselect the at least one sub-process depending upon their requirements.

At block 304, units per transaction is identified for the each of the at least one sub-process based on requirement data 110 extracted from a capability database 108. In one implementation, the transaction module 114 may be configured to extract the requirement data 110 from the capability database 108. Once the requirement data 110 for the at least one sub-process is available, the transaction module 114 determine unit of measure for the each of the at least one sub-process to identify the units per transaction for the each of the at least one sub-process. The unit of measure may provide information about amount of work to be performed for a sub-process. For example, units per transaction for a "reporting" sub-process may be identified based on "number of reports" which is the unit of measure in this example.

At block 306, a process complexity is assigned to the each of the at least one sub-process based on a complexity score computed for the each of the at least one sub-process. The complexity score may be computed based on a complexity questionnaire. Team members of the service provide are asked to rate various parameters of the sub-processes. The team members may rate the parameters based on their prior experience with the same type of sub-process and comfort level with sub-process. The parameters may include various factors which may cause variation in efforts required for the sub-process. For example, the parameter may include factors related to operating conditions, such as "technology or platform", "input source is electronic or manual", and "industry". In one implementation, the transaction module 114 may generate the complexity questionnaire for the team members to rate the parameters in the each of the at least one sub-process. Further, the transaction module 114 may compute the complexity score for the each of the at least one sub-process based on the complexity questionnaire and may assign the process complexity to the each of the at least one sub-process based on the complexity score of the each of the at least one sub-process.

At block 308, processing time of the each of the at least one sub-process is obtained from historical data 112 based on the process complexity assigned to each of the at least one sub-process. The processing time may be defined as time taken for performing a sub-process which may be calculated based on the historical data 112 of the sub-process. The processing time may also vary with skill of a person who is performing the sub-process. Therefore, complexity assigned by team members of the service provider may be also considered while calculating the processing time. In one implementation, the transaction module 114 may obtain the processing time from the historical data 112 stored in the capability database 108 based on the process complexity assigned to the each of the at least one sub-process.

At block 310, estimated efforts for performing the one or more transactions are ascertained based on the processing time obtained for the each of the at least one sub-process. For example, if a transaction comprises sub-processes which have high process complexity, then based on the processing time of the sub-process, estimated efforts may be ascertained. In one implementation, the analysis module 212 may ascertain the estimated efforts for performing the one or more transactions. In one example, if it is ascertained based on the historical data 112 of an "invoice" transaction that the processing time of one day is needed, then the estimated effort main be ascertained.

At block 312, pricing for the each of the one or more transactions are determined based on the estimated efforts. In an example, if the estimated efforts for a transaction are on higher side, then the pricing for the transaction will be on higher side. In one implementation, the analysis module 212 may determine pricing for the each of the one or more transactions based on the estimated efforts. Once the pricing for the each of the one or more transaction is determined, the analysis module 212 may allow a service provider to perform a sensitivity analysis to analyze variations in revenue generated with respect to volume of the one or more transactions. With the sensitivity analysis, the service provider may foresee the revenue generated over period of time and tweak the pricing of efforts and resources, in case of any financial loss or unutilized resources. Further, with the sensitivity analysis, the service provider or the client may compare the transaction based pricing to the input based pricing.

Although embodiments for the determination of transaction based pricing have been described in language specific to structural features and/or methods, it is to be understood that the invention is not necessarily limited to the specific features or methods described. Rather, the specific features and methods are disclosed as exemplary implementations for determining the transaction based pricing.

We claim:

1. A computing system for defining and configuring transactions in a structured and uniform manner for accurately estimating efforts for performing the transactions, the system comprising:
a processor (202);
a transaction module (114), coupled to the processor (202), the transaction module configured to,
define a number of transactions, wherein the transactions include plurality of sub-processes to execute the transactions, wherein the plurality of sub-processes in the transactions get performed in different combinations at different point of time, wherein the plurality of sub-processes comprise invoice processing, debit balance and fund recovery, process payments, query resolution, reporting, vendor maintenance, and vendor reconciliation;
identify units per transaction for each of the plurality of sub-processes based on requirement data, wherein the units per transaction for each sub-process defines an amount of work to be performed to complete each sub-process of the plurality of sub-processes, and wherein the requirement data comprises pre-specified data associated with the amount the work and a type of the work required to execute each sub-process of the transactions, and wherein the units per transactions are identified based on a unit of measure for the work to be performed to complete the sub-process as available in the requirement data, wherein the units per transaction are at least one of invoice when the sub-process is invoice processing, number of invoices handled when the sub-process is debit balance and fund recovery, number of disbursements when the sub-process is process payments, invoices and queries handled when the sub-process is query resolution, number of reports when the sub-process is reporting, number of request handled when the sub-process is vendor maintenance, and number of reconciliation done when the sub-process is vendor reconciliation;
assign a process complexity to each of the plurality of sub-processes based on a complexity score computed for each of the plurality of sub-processes, wherein the complexity score is computed based on a plurality of parameters associated with each sub-process, and the plurality of parameters capture variation in work efforts required for completing the plurality of sub-processes, wherein the plurality of parameters are follow-up recovery, platform, technology, input source, industry, region, first time invoicing, and data readiness, and wherein the complexity score is computed based on a predefined ranking given to each of the plurality of parameters and a parameter complexity score given to each of the plurality of parameters by a user, and wherein the process complexity to each sub-process is assigned based on a range of the complexity score for corresponding sub-process; and
obtain a processing time for each of the plurality of sub-processes based on i) the process complexity assigned to each of the plurality of sub-processes and ii) historical data associated with execution of the plurality of sub-processes, wherein the processing time is a time required for performing the sub-process, and the historical data stores the time required for execution of the plurality of sub-processes in history; and
an analysis module (212), coupled to the processor (202), the analysis module (212) configured to,
estimate efforts for performing the transactions based on the processing time obtained for each of the plurality of sub-processes.

2. The system as claimed in claim 1, wherein the analysis module is further configured to determine pricing for the transactions based on the estimated efforts.

3. The system as claimed in claim 1, wherein the transaction module is configured to extract the requirement data and the historical data from a capability database.

4. The system as claimed in claim 1, wherein the requirement data includes at least one of expected volume of the transactions, and a list of sub-process from the one or more sub-processes to be performed for executing the transactions.

5. The system as claimed in claim 1, wherein the transaction module is configured to obtain the processing time for each of the plurality of sub-processes from the historical data.

6. The system as claimed in claim 1, wherein the transaction module is configured to allow the one or more users to select or deselect sub-processes from the plurality of sub-processes depending upon user requirements.

7. The system as claimed in claim 1, wherein the transaction module is configured to compute a total possible score by adding the complexity score for each of the plurality of sub-processes of the transactions, and assign a high process complexity to the sub-process having the complexity score ranging from about 0 to 30% of the total possible score, a medium process complexity to the sub-process having the complexity score ranging from about 31% to 75%, and a low process complexity to a sub-process having the complexity score ranging from about 76% to 100%.

8. A computer-implemented method for defining and configuring transactions in a structured and uniform mode for accurately estimating efforts for performing the transactions, the method comprising:
    defining, by a processor, a number of transactions, wherein the transactions include plurality of sub-processes to execute the transactions, wherein the plurality of sub-processes in the transactions get performed in different combinations at different point of time, wherein the plurality of sub-processes comprise invoice processing, debit balance and fund recovery, process payments, query resolution, reporting, vendor maintenance, and vendor reconciliation;
    identifying, by the processor, units per transaction for each of the plurality of sub-processes based on requirement data, wherein the units per transaction for each sub-process defines an amount of work to be performed to complete each sub-process of the plurality of sub-processes, and wherein the requirement data comprises pre-specified data associated with an amount the work and a type of the work required to execute each sub-process of the transactions, and wherein the units per transactions are identified based on a unit of measure for the work to be performed to complete the sub-process as available in the requirement data, wherein the units per transaction are at least one of invoice when the sub-process is invoice processing, number of invoices handled when the sub-process is debit balance and fund recovery, number of disbursements when the sub-process is process payments, invoices and queries handled when the sub-process is query resolution, number of reports when the sub-process is reporting, number of request handled when the sub-process is vendor maintenance, and number of reconciliation done when the sub-process is vendor reconciliation;
    assigning, by the processor, a process complexity to each of the plurality of sub-processes based on a complexity score computed for each of the plurality of sub-processes, wherein the complexity score is computed based on plurality of parameters associated with each sub-process, and the plurality of parameters capture variation in work efforts required for completing the plurality of sub-processes, wherein the plurality of parameters are follow-up recovery, platform, technology, input source, industry, region, first time invoicing, and data readiness, and wherein the complexity score is computed based on a predefined ranking given to each of the plurality of parameters and a parameter complexity score given to each of the plurality of parameters by a user, and wherein the process complexity to each sub-process is assigned based on a range of the complexity score for corresponding sub-process;
    obtaining, by the processor, a processing time for each of the plurality of sub-processes based on i) the process complexity assigned to each of the plurality of sub-processes and ii) historical data associated with execution of the plurality of sub-processes, wherein the processing time is a time required for performing the sub-process, and the historical data stores the time required for execution of the plurality of sub-processes in history;
    estimating efforts for performing the transactions based on the processing time obtained for each of the plurality of sub-processes.

9. The method as claimed in claim 8, wherein the method further comprises determining pricing for the transactions based on the estimated efforts.

10. The method as claimed in claim 8, wherein the each of the plurality of sub-processes is selected based on the requirement data.

11. A computer-readable medium having embodied thereon a computer program executed by a processor for executing a method for estimating efforts to perform one or more transactions, the method comprising:
    defining a number of transactions, wherein the transactions include plurality of sub-processes to execute the transactions, wherein the plurality of sub-processes in the transactions get performed in different combinations at different point of time, wherein the plurality of sub-processes comprise invoice processing, debit balance and fund recovery, process payments, query resolution, reporting, vendor maintenance, and vendor reconciliation;
    identifying units per transaction for each of the plurality of sub-processes based on requirement data, wherein the units per transaction for each sub-process defines an amount of work to be performed to complete each sub-process of the plurality of sub-processes, and wherein the requirement data comprises pre-specified data associated with an amount the work and a type of the work required to execute each sub-process of the transactions, and wherein the units per transactions are identified based on a unit of measure for the work to be performed to complete the sub-process as available in the requirement data, wherein the units per transaction are at least one of invoice when the sub-process is invoice processing, number of invoices handled when the sub-process is debit balance and fund recovery, number of disbursements when the sub-process is process payments, invoices and queries handled when the sub-process is query resolution, number of reports when the sub-process is reporting, number of request handled when the sub-process is vendor maintenance, and number of reconciliation done when the sub-process is vendor reconciliation;
    assigning a process complexity to each of the one or more sub-processes based on a complexity score computed for each of the plurality of sub-processes, wherein the complexity score is computed based on plurality of parameters associated with each sub-process, and the plurality of parameters indicates variation in work efforts required for completing the plurality of sub-processes, wherein the plurality of parameters are follow-up recovery, platform, technology, input source, industry, region, first time invoicing, and data readiness, and wherein the complexity score is computed based on a predefined ranking given to each of the plurality of parameters and a parameter complexity score given to each of the plurality of parameters by a user, and wherein the process complexity to each sub-process is assigned based on a range of the complexity score for corresponding sub-process;

obtaining a processing time for each of the plurality of sub-processes based on i) the process complexity assigned to each of the plurality of sub-processes and ii) historical data associated with execution of the plurality of sub-processes, wherein the processing time is a time required for performing the sub-process and the processing time is calculated based on the historical data of corresponding sub-process, and the historical data stores the time required for execution of the plurality of sub-processes in history; and estimating efforts for performing the transactions based on the processing time obtained for each of the plurality of sub-processes.

12. The system of claim 7, wherein the transaction module is configured to assign one of a low complexity bucket, a medium complexity bucket and a high complexity bucket to each sub-process based on the process complexity assigned to each sub-process, and obtain the processing time for each sub-process from the historical data based on the assigning of one of the low complexity bucket, the medium complexity bucket and the high complexity bucket to each sub-process.

13. The method of claim 8 further comprises computing a total possible score for each transaction by adding the complexity score for each of the one or more sub-processes of the at least one transaction, and assigning a high process complexity to the sub-process having the complexity score ranging from about 0 to 30% of the total possible score, a medium process complexity to the sub-process having the complexity score ranging from about 31% to 75%, and a low process complexity to a sub-process having the complexity score ranging from about to 100%.

14. The method of claim 13 further comprises assigning each sub-process one of a low complexity bucket, a medium complexity bucket and a high complexity bucket based on the process complexity assigned to each sub-process, and obtaining the processing time for each sub-process from the historical data based on the assigning of one of the low complexity bucket, the medium complexity bucket and the high complexity bucket to each sub-process.

15. The computer readable medium of claim 11 further comprises the program code for, computing a total possible score for each transaction by adding the complexity score for each of the one or more sub-processes of the at least one transaction, and assigning a high process complexity to the sub-process having the complexity score ranging from about 0 to 30% of the total possible score, a medium process complexity to the sub-process having the complexity score ranging from about 31% to 75%, and a low process complexity to a sub-process having the complexity score ranging from about 76% to 100%.

16. The computer readable medium of claim 15 further comprises the program code for assigning each sub-process one of a low complexity bucket, a medium complexity bucket and a high complexity bucket based on the process complexity assigned to each sub-process, and obtaining the processing time for each sub-process from the historical data based on the assigning of one of the low complexity bucket, the medium complexity bucket and the high complexity bucket to each sub-process.

17. The computer readable medium of claim 11 further comprises determining pricing for the transactions based on the estimated efforts.

* * * * *